United States Patent
Jang et al.

(10) Patent No.: US 8,131,952 B2
(45) Date of Patent: Mar. 6, 2012

(54) APPARATUS AND METHOD FOR EFFICIENT MEMORY USE IN PORTABLE TERMINAL

(75) Inventors: Seok-Kyu Jang, Suwon-si (KR); Young-Hoon Min, Suwon-si (KR); Woo-Gyu Lim, Seoul (KR); Young Cheul Wee, Suwon-si (KR)

(73) Assignees: Samsung Electronics Co., Ltd. (KR); Quram Co., Ltd. (KR)

( * ) Notice: Subject to any disclaimer, the term of this patent is extended or adjusted under 35 U.S.C. 154(b) by 886 days.

(21) Appl. No.: 11/874,580

(22) Filed: Oct. 18, 2007

(65) Prior Publication Data

US 2008/0119225 A1    May 22, 2008

(30) Foreign Application Priority Data

Nov. 22, 2006    (KR) .................. 10-2006-0115683

(51) Int. Cl.
*G06F 13/00*      (2006.01)
(52) U.S. Cl. . 711/156; 711/165; 711/206; 711/E12.008; 710/68
(58) Field of Classification Search .................. None
See application file for complete search history.

(56) References Cited

U.S. PATENT DOCUMENTS

| | | | |
|---|---|---|---|
| 5,155,484 A * | 10/1992 | Chambers, IV | 341/55 |
| 5,481,701 A * | 1/1996 | Chambers, IV | 1/1 |
| 5,530,847 A * | 6/1996 | Schieve et al. | 714/38 |
| 5,940,871 A | 8/1999 | Goyal et al. | |
| 6,011,590 A * | 1/2000 | Saukkonen | 375/240.05 |
| 6,145,069 A | 11/2000 | Dye | |
| 6,332,172 B1 | 12/2001 | Iverson | |
| 6,732,265 B2 * | 5/2004 | Esfahani et al. | 713/2 |
| 2002/0178333 A1 | 11/2002 | Wilson et al. | |

FOREIGN PATENT DOCUMENTS

| | | |
|---|---|---|
| GB | 2 319 865 | 6/1998 |
| KR | 2000-0069633 | 11/2000 |
| KR | 1020060024921 | 3/2006 |
| KR | 1020060066913 | 6/2006 |

* cited by examiner

*Primary Examiner* — Hetul Patel
(74) *Attorney, Agent, or Firm* — The Farrell Law Firm, P.C.

(57) ABSTRACT

Provided are an apparatus and a method for saving a memory in a portable terminal, the method includes receiving a request for basic data and an address indicating a storage position of the basic data; determining whether the requested basic data has been stored in a paging buffer; if it is determined that the requested basic data has not been stored in the paging buffer, transforming the address of the requested basic data into an address of a corresponding compressed block using a block address table; searching the compressed basic data for the compressed block corresponding to the address of the compressed block; decompressing the searched compressed block; storing data of the decompressed block in the paging buffer; and returning the requested basic data stored in the paging buffer.

8 Claims, 4 Drawing Sheets

APPARATUS AND METHOD FOR EFFICIENT MEMORY USE IN PORTABLE TERMINAL

PRIORITY

This application claims priority under 35 U.S.C. §119 to an application filed in the Korean Intellectual Property Office on Nov. 22, 2006 and assigned Serial No. 2006-115683, the contents of which are incorporated herein by reference.

BACKGROUND OF THE INVENTION

1. Field of the Invention

The present invention relates generally to an apparatus and a method for efficient memory utilization in a portable terminal, and, in particular, to an apparatus and a method for compressing and storing data, which is to be basically stored and operated, to maximize memory resources available in a portable terminal.

2. Description of the Related Art

Portable terminals such as mobile communication terminals or Personal Digital Assistant (PDAs) have been widely used. Such a portable terminal is used to manage simple telephone calls, schedules, etc. and photograph images or moving pictures through a digital camera installed therein. The portable terminal is also used to view satellite broadcasts, edit documents, play games, execute navigations, listen to music, and transmit and receive multimedia messages including simple messages and photographed images or moving pictures. Thus, the application ranges of portable terminals continue to expand.

With the diversification of functions of portable terminals, portable terminals must store basic data for executing application programs for providing the functions of the portable terminals. In general, an operating system or an application program stored in a portable terminal includes compressed data and uncompressed data. The compressed data is generally large in size, and includes images compressed in a generally known JPEG or other format, and sound, moving pictures, etc. compressed with a specific codec in an MP3, MP4, or other known format.

Portable terminals have limited sizes in terms of their portability. Thus, a memory has a limited capacity. Capacities of memories, i.e. storage devices, mounted in portable terminals have increased with the development of communication technology. However, user demand for larger storage devices continues increase due to increasing number of functions of modern portable terminals.

Accordingly, there is required an apparatus and a method for compressing, storing, and managing uncompressed data of basic data used by an operating system and basic application programs that are necessary for a portable terminal, to reduce consumption of memory storage space so as to provide more storage space to a user.

SUMMARY OF THE INVENTION

An aspect of the present invention is to substantially solve at least the above problems and/or disadvantages and to provide at least the advantages below. Accordingly, an aspect of the present invention is to provide an apparatus and a method for saving a memory in a portable terminal.

Another aspect of the present invention is to provide an apparatus and a method for compressing and storing data, which is to be basically stored, to save a memory in a portable terminal.

A further aspect of the present invention is to provide an apparatus and a method for compressing, storing, and managing data to be basically stored in a portable terminal.

A still further aspect of the present invention is to provide an apparatus and a method for dividing data to be basically stored into blocks as units to be stored in a paging buffer, storing and managing the blocks in a portable terminal.

The above aspects are achieved by providing a point-to-point emulation apparatus and method in a broadband wireless communication system.

According to one aspect of the present invention, an apparatus is provided for saving a memory in a portable terminal that includes a memory storing basic data in a format of compressed basic data; a block address table storing addresses of compressed blocks corresponding to addresses of the basic data; a paging buffer temporarily storing requested basic data; a decompressor checking an address of a compressed block corresponding to an address of the requested basic data using the block address table, decompressing the compressed block corresponding to the address of the compressed block of the compressed basic data stored in the memory, and storing the requested basic data in the paging buffer; and a memory manager receiving a request for the basic data and the address indicating a storage position of the basic data, determining whether the requested basic data has been stored in the paging buffer, if it is determined that the basic data has not been stored in the paging buffer, controlling the decompressor to decompress the requested basic data and store the decompressed basic data in the paging buffer, and if it is determined that the basic data has been stored in the paging buffer, returning the address of the requested basic data.

According to another aspect of the present invention, a method of saving a memory in a portable terminal is provided that includes receiving a request for basic data and an address indicating a storage position of the basic data; determining whether the requested basic data has been stored in a paging buffer; if it is determined that the requested basic data has not been stored in the paging buffer, transforming the address of the requested basic data into an address of a corresponding compressed block using a block address table; searching the compressed basic data for the compressed block corresponding to the address of the compressed block; decompressing the searched compressed block; storing data of the decompressed block in the paging buffer; and returning the requested basic data stored in the paging buffer.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention provides an apparatus and a method for compressing and storing all types of basic data necessary for operating a portable terminal and performing functions of the portable terminal, as well as controlling access to all types of compressed and stored basic data in order to efficiently utilize memory in the portable terminal.

As described below, resources that are basically necessary for operating a portable terminal and performing functions of the portable terminal are referred to as basic data. If the basic data is compressed, the basic data is referred to herein as compressed basic data.

Figure 1:
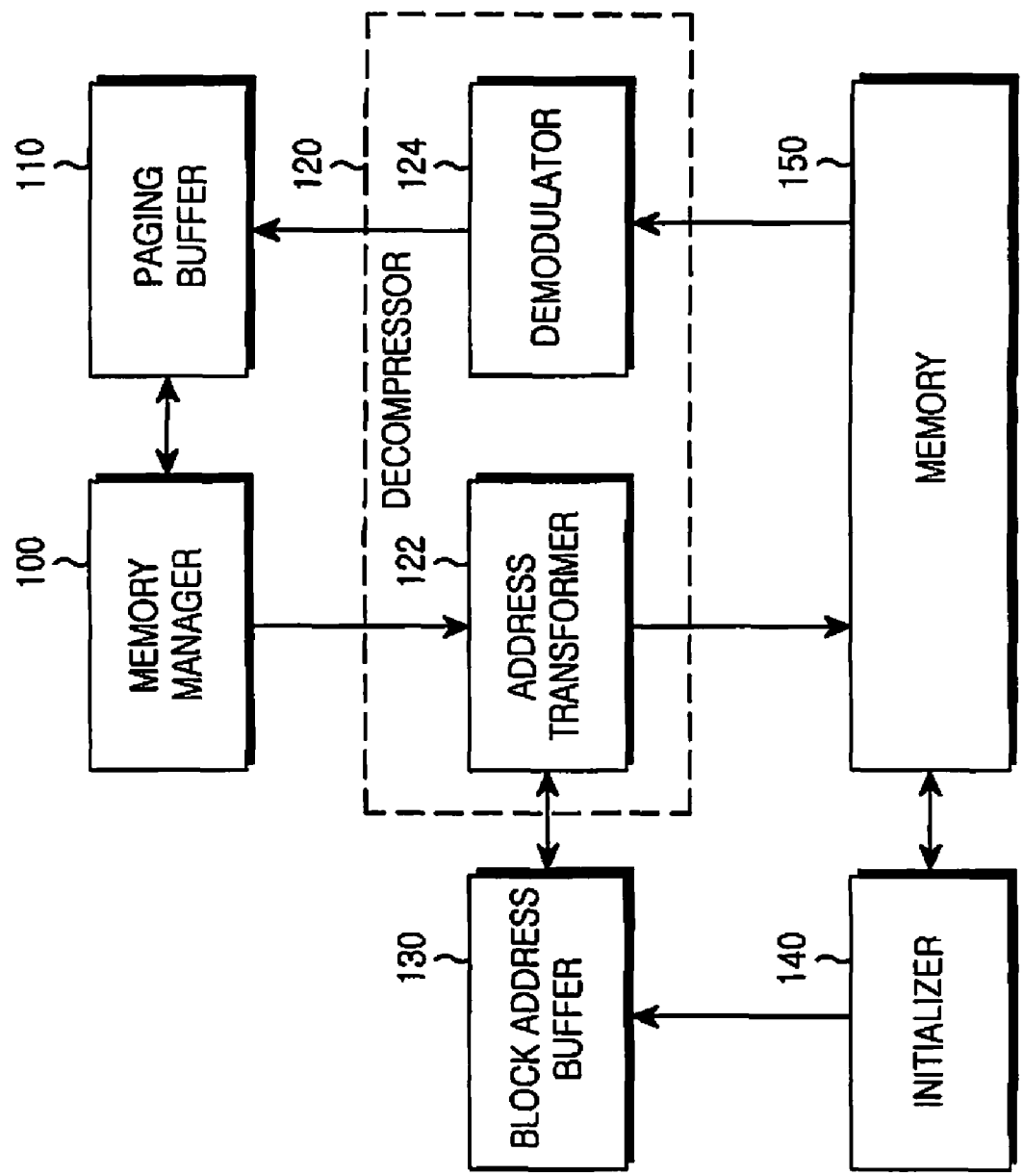
FIG. 1 is a block diagram of a portable terminal capable of efficiently utilizing memory according to the present invention.

FIG. 1 is a block diagram of a portable terminal capable of efficiently utilizing memory according to the present invention. Referring to FIG. 1, the portable terminal according to the present preferred embodiment includes a memory manager 100, a paging buffer 110, a decompressor 120, a block address buffer 130, an initializer 140, and a memory 150.

The memory manager 100 receives from a file system (not shown) of the portable terminal a request for basic data and an address indicating a storage position of the basic data. The memory manager 100 determines whether the requested basic data has been stored in the paging buffer 110. If determined that the requested basic data has been stored in the paging buffer 110, the memory manager 100 returns the basic data to the file system. If determined that the basic data has not been stored in the paging buffer 110, the memory manager 100 requests that the decompressor 120 search for the requested basic data and store the requested basic data in the paging buffer 110. If the paging buffer 110 updates stored data together with the requested basic data, the memory manager 100 returns the requested basic data to the file system.

The paging buffer 110 is a storage place having fast access and response velocities and temporarily stores data which is being currently used in the portable terminal. According to the present invention, the paging buffer 110 temporarily stores decompressed basic data received through the decompressor 120 and provides the requested basic data according to a request of the memory manager 100. The paging buffer 110 is preferably a Synchronous Dynamic Random Access Memory (SDRAM).

The decompressor 120 includes an address transformer 122 and a demodulator 124. The address transformer 122 transforms an address of the basic data requested from the memory manager 100 into an address of a compressed block through the block address buffer 130. The address transformer 122 also transmits the address of the compressed block to the memory 150 to request the compressed block stored in the address of the compressed block. The demodulator 124 receives the compressed block stored in the address of the compressed block from the memory 150, decompresses the compressed block, and provides the decompressed block to the paging buffer 110.

The block address buffer 130 stores addresses of compressed blocks corresponding to addresses of basic data as a block address table. The block address buffer 130 temporarily stores the block address table while the portable terminal is powered up.

If the portable terminal is powered up and thus is to be initialized, the initializer 140 searches the memory 150 for the block address table and stores the block address table in the block address buffer 130.

The memory 150 stores the basic data necessary for an overall operation of the portable terminal in the format of compressed basic data and storage data, e.g., telephone numbers, System Management Service messages, compressed image files, moving pictures, etc. The format of the compressed basic data stored in the memory 150 is described in detail with reference to FIG. 2. The memory 150 is preferably a NAND Flash Memory.

Figure 2:
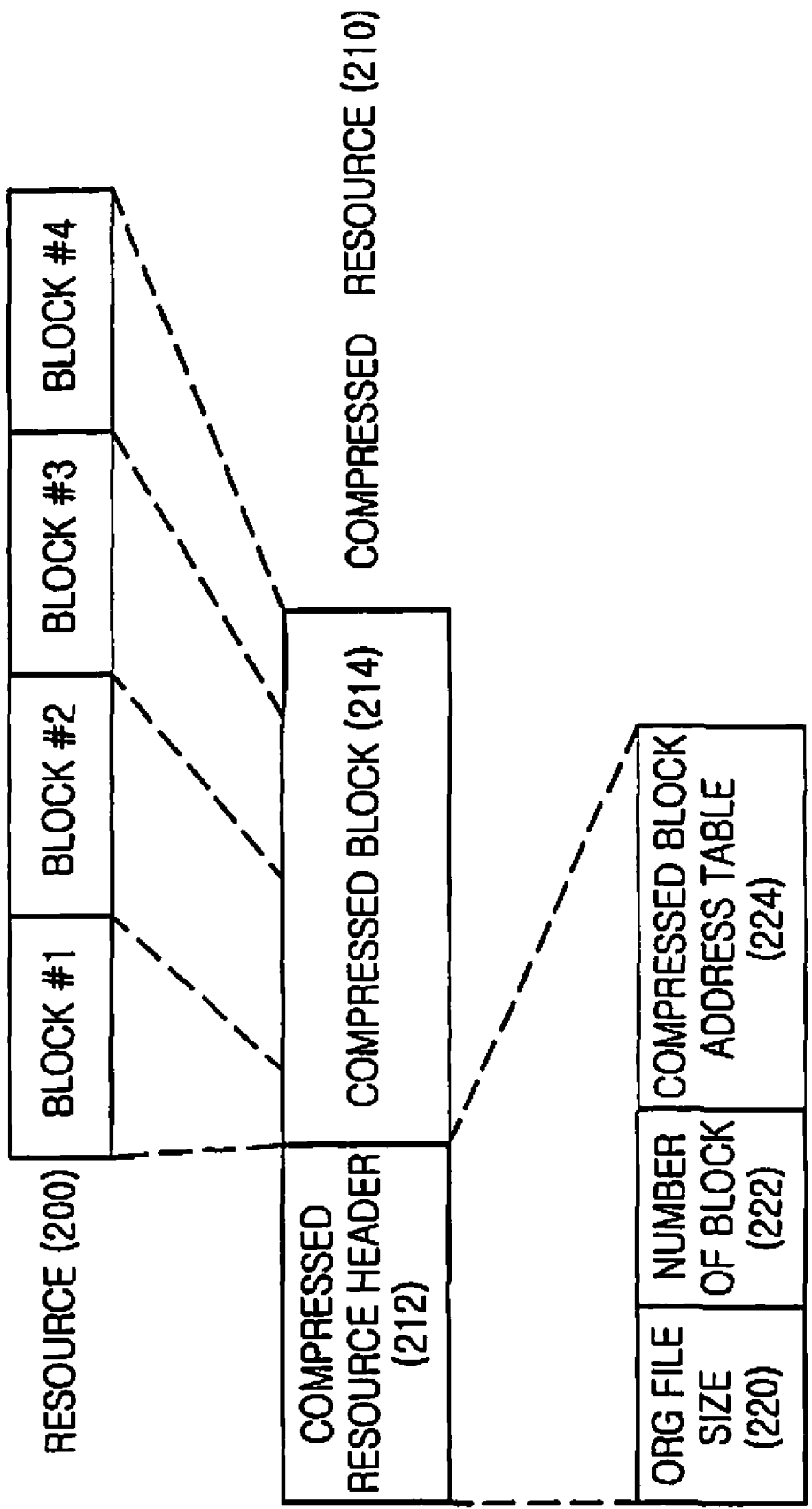
FIG. 2 illustrates a format of compressed basic data according to the present invention.

FIG. 2 illustrates a format of compressed basic data according to the present invention. A compressed resource 210 includes a compressed resource header 212 and a compressed block set 214.

The compressed block set 214 refers to compressed basic data. Here, a resource 200 is divided into blocks as units to be stored in the paging buffer 110, the blocks are separately compressed, and the compressed blocks are integrated into the compressed basic data.

The compressed resource header 212 includes information of the compressed resource 210, i.e. an original file size 220 of the basic data when not compressed, a total number of compressed blocks 222, and a compressed block address table 224 storing addresses of compressed blocks corresponding to addresses of basic data.

When the initializer 140 initializes the portable terminal, the initializer 140 stores the block address table 224 of the compressed resource header 212 in the block address buffer 130.

The compressed resource 210 is generally generated and stored by a manufacturer or enterpriser of the portable terminal. The compressed resource 210 is in a preferred embodiment stored through a direct connection to the memory 150 of the portable terminal by cable when the portable terminal is introduced or when a program is updated. Alternatively, the compressed resource 210 may be downloaded and stored via wireless communications. A process of generating the compressed resource 210 is described with reference to FIG. 4.

Figure 3:
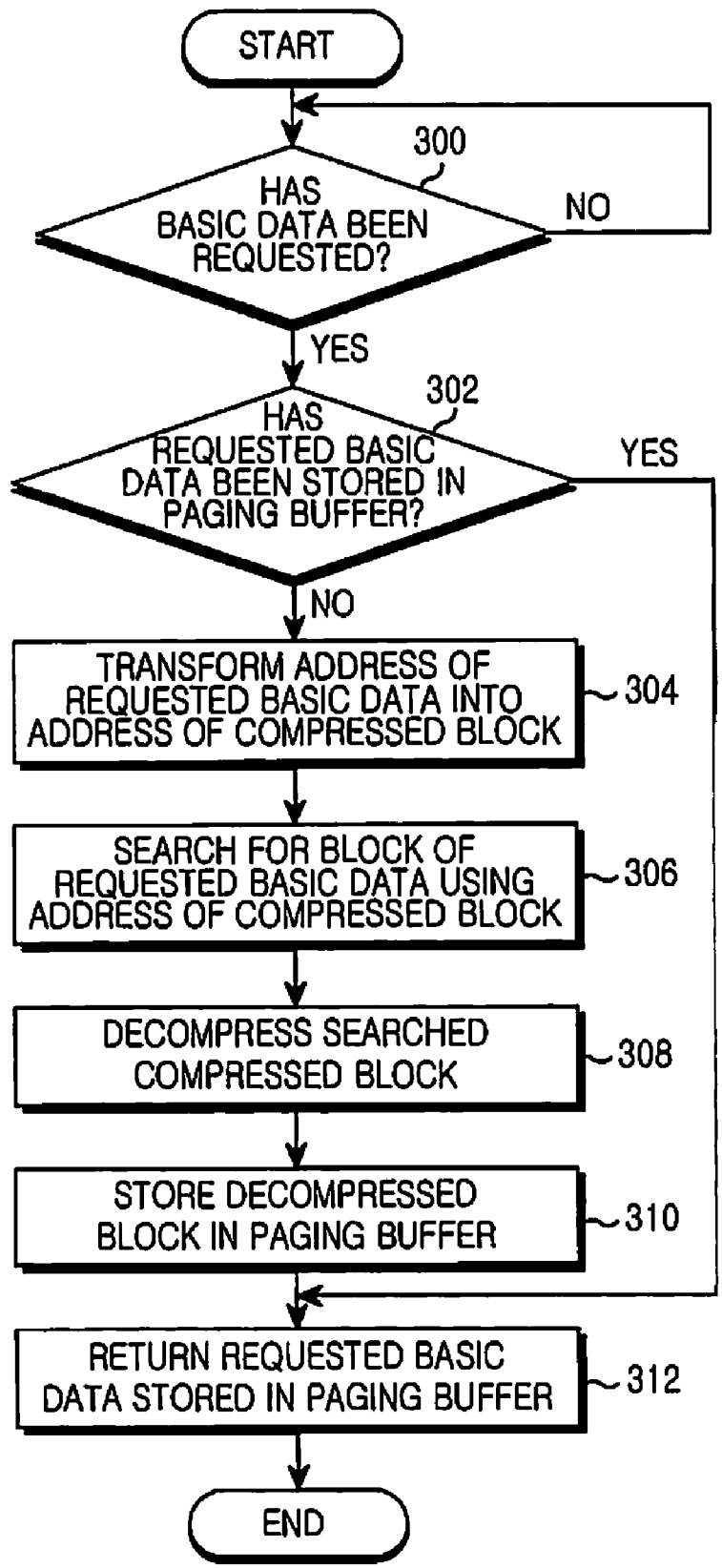
FIG. 3 is a flowchart of a process of searching compressed basic data for requested basic data according to a request for basic data and returning the requested basic data in a portable terminal, according to the present invention.

FIG. 3 is a flowchart of a process of searching compressed basic data for requested basic data according to a request for basic data and returning the requested basic data in a portable terminal, according to the present invention. Referring to FIG. 3, in step 300, the memory manager 100 of the portable terminal determines whether basic data and an address indicating a storage position of the basic data have been requested. If determined in step 300 that the basic data and the address have been requested, the memory manger 100 proceeds to step 302 to determine whether the requested basic data has been stored in the paging buffer 110. If it is determined in step 302 that the requested basic data has been stored in the paging buffer 110, the memory manager 100 advances to step 312 and returns the requested basic data stored in the paging buffer 110, and then ends the process.

If determined in step 302 that the requested basic data has not been stored in the paging buffer 110, the address transformer 122 proceeds to step 304 to transform the address of the requested basic data into an address of a corresponding compressed block using a block address table stored in the block address buffer 130. In step 306, the address transformer 122 searches the memory 150 for the compressed block corresponding to the address of the compressed block. In step 308, the demodulator 124 decompresses the searched compressed block. In step 310, the demodulator 124 stores data of the decompressed block in the paging buffer 110. In step 312, the memory manager 100 returns the requested basic data stored in the paging buffer 110 and then ends the present process.

Figure 4:
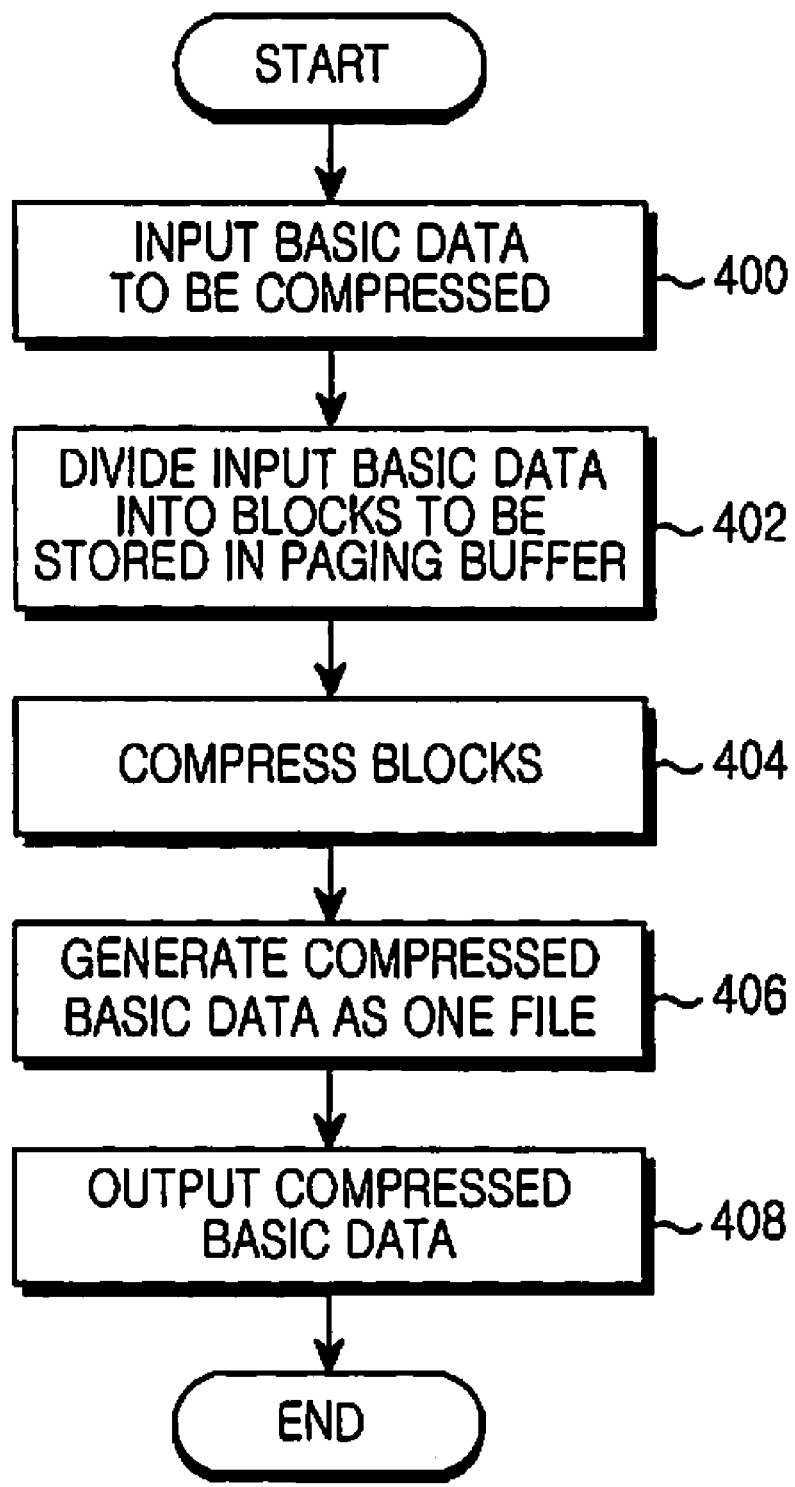
FIG. 4 is flowchart of a process of generating compressed basic data stored in a portable terminal according to the present invention.

FIG. 4 is flowchart of a process of generating compressed basic data stored in a portable terminal according to the present invention. Referring to FIG. 4, in step 400, a manufacturer of the portable terminal or an enterpriser providing a service using the portable terminal receives basic data to be compressed using a compressed basic data generator. In step 402, the basic data is divided into blocks as units to be stored in a paging buffer 110. In step 404, the blocks are compressed. In step 406, compressed basic data including the compressed blocks and a compressed resource header is generated. In step 408, the compressed basic data is output to the portable terminal.

The present invention as described above can provide an apparatus and a method for saving a memory in a portable terminal. The method includes receiving a request for basic data and an address indicating a storage position of the basic data; determining whether the basic data has been stored in a paging buffer; if it is determined that the basic data has not been stored in the paging buffer, transforming the address of the requested basic data into an address of a corresponding compressed block using a block address table; searching the compressed basic data for the compressed block corresponding to the address of the compressed block; decompressing the compressed block; storing data of the decompressed block in the paging buffer; and returning the requested basic data stored in the paging buffer. Thus, memory can be saved so as to provide a user with more storage space, and also to reduce the cost of materials use to manufacture the terminal.

Alternate embodiments of the present invention can also comprise computer readable codes on a computer readable medium. The computer readable medium includes any data storage device that can store data that can be read by a computer system. Examples of a computer readable medium include magnetic storage media (such as ROM, floppy disks, and hard disks, among others), optical recording media (such as CD-ROMs or DVDs), and storage mechanisms such as carrier waves (such as transmission through the Internet). The computer readable medium can also be distributed over network coupled computer systems so that the computer readable code is stored and executed in a distributed fashion. Also, functional programs, codes, and code segments for accomplishing the present invention can be construed by programmers of ordinary skill in the art to which the present invention pertains.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An apparatus for efficient memory use in a portable terminal, the apparatus comprising:
   a memory for storing basic data in a format of compressed basic data;
   a block address table for storing addresses of compressed blocks corresponding to addresses of the basic data;
   a paging buffer for temporarily storing requested basic data;
   a decompressor for checking an address of a compressed block corresponding to an address of requested basic data using the block address table, decompressing the compressed block corresponding to the address of the compressed block of the compressed basic data stored in the memory, and storing the requested basic data in the paging buffer; and
   a memory manager for receiving a request for the basic data and the address indicating a storage position of the basic data, determining whether the requested basic data has been stored in the paging buffer, wherein if determined that the basic data has not been stored in the paging buffer, controlling the decompressor to decompress the requested basic data and store the decompressed basic data in the paging buffer, and if determined that the basic data has been stored in the paging buffer, returning the address of the requested basic data;
   an initializer which searches the compressed basic data stored in the memory for the block address table and stores the block address table in a block address buffer when the portable terminal is initialized,
   wherein the compressed basic data comprises a compressed resource header and compressed blocks, and
   the compressed resource header comprises information of the compressed basic data, and the compressed blocks are obtained by dividing the basic data into units to be stored in the paging buffer,
   wherein the compressed resource header comprises an original file size of the basic data, a total number of compressed blocks, and the block address table storing the addresses of the compressed blocks corresponding to the addresses of the basic data, and
   wherein the compressed basic data is generated and stored in the portable terminal by a manufacturer of the portable terminal or an enterpriser providing a service using a compressed basic data generator.

2. The apparatus of claim 1, wherein if determined that the basic data has been stored in the paging buffer, the memory manager returns the requested basic data stored in the paging buffer.

3. The apparatus of claim 1, wherein the decompressor comprises:
   an address transformer for transforming the address of the requested basic data into the address of the corresponding compressed block using the block address table; and
   a demodulator decompressing the compressed block and storing the decompressed block in the paging buffer.

4. The apparatus of claim 1, wherein the compressed basic data generator receives the basic data to be compressed, divides the basic data into the blocks as the units to be stored in the paging buffer, compresses the blocks, and generates the compressed basic data comprising the compressed blocks and the compressed resource header.

5. A method for efficient memory use in a portable terminal, the method comprising:
   searching, by an initializer, a compressed basic data stored in the memory for a block address table and storing the block address table in a block address buffer, when the portable terminal is initialized;
   receiving a request for basic data and an address indicating a storage position of the basic data;
   determining whether the requested basic data has been stored in a paging buffer;
   if determined that the requested basic data has not been stored in the paging buffer, transforming the address of the requested basic data into an address of a corresponding compressed block using the block address table;
   searching the compressed basic data for the compressed block corresponding to the address of the compressed block;
   decompressing the searched compressed block;

storing data of the decompressed block in the paging buffer; and returning the requested basic data stored in the paging buffer, wherein the compressed basic data comprises a compressed resource header and compressed blocks, and the compressed resource header comprises information of the compressed basic data, and the compressed blocks are obtained by dividing the basic data into units to be stored in the paging buffer, wherein the compressed resource header comprises an original file size of the basic data, a total number of compressed blocks, and the block address table storing the addresses of the compressed blocks corresponding to the addresses of the basic data and wherein the compressed basic data is generated and stored in the portable terminal by a manufacturer of the portable terminal or an enterpriser providing a service using a compressed basic data generator.

6. The method of claim 5, further comprising, if determined that the requested basic data has been stored in the paging buffer, returning the requested basic data stored in the paging buffer.

7. The method of claim 5, wherein the generation of the compressed basic data using the compressed basic data generator comprises:

receiving the basic data to be compressed;

dividing the basic data into the blocks as the units to be stored in the paging buffer and compressing the blocks; and generating the compressed basic data comprising the compressed blocks and the compressed resource header.

8. A non-transitory computer-readable recording medium having recorded thereon a program for efficient memory use in a portable terminal, comprising:

a first code segment, searching, by an initializer, a compressed basic data stored in the memory for a block address table and storing the block address table in a block address buffer, when the portable terminal is initialized a second code segment, receiving a request for basic data and an address indicating a storage position of the basic data;

a third code segment, determining whether the requested basic data has been stored in a paging buffer;

a fourth code segment, transforming the address of the requested basic data into an address of a corresponding compressed block using the block address table, if determined that the requested basic data has not been stored in the paging buffer;

a fifth code segment, searching the compressed basic data for the compressed block corresponding to the address of the compressed block;

a sixth code segment, decompressing the searched compressed block;

a seventh code segment, storing data of the decompressed block in the paging buffer; and a eighth code segment, returning the requested basic data stored in the paging buffer, wherein the compressed basic data comprises a compressed resource header and compressed blocks, and the compressed resource header comprises information of the compressed basic data, and the compressed blocks are obtained by dividing the basic data into units to be stored in the paging buffer, wherein the compressed resource header comprises an original file size of the basic data, a total number of compressed blocks, and the block address table storing the addresses of the compressed blocks corresponding to the addresses of the basic data, and wherein the compressed basic data is generated and stored in the portable terminal by a manufacturer of the portable terminal or an enterpriser providing a service using a compressed basic data generator.

* * * * *